United States Patent
Bodelin et al.

(10) Patent No.: US 6,193,173 B1
(45) Date of Patent: Feb. 27, 2001

(54) BURNER WITH AN IMPROVED INJECTOR AND PROCESS FOR MANUFACTURING THIS INJECTOR

(75) Inventors: Pierre Bodelin, Vanves; Patrick Recourt, Marcoussis; Annie Meyer, Pontoise; Jean-Paul Guedra, Vallangoujard, all of (FR)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/333,889

(22) Filed: Jun. 15, 1999

(30) Foreign Application Priority Data

Jun. 15, 1998 (FR) .................................. 98 07500

(51) Int. Cl.[7] .................................................. F23D 14/48
(52) U.S. Cl. .................. 239/589; 239/DIG. 19; 239/424; 148/325; 148/639; 420/62; 29/890.02
(58) Field of Search ............................ 239/DIG. 19, 423, 239/424, 589; 148/325, 326, 605, 606, 607, 627, 639; 420/62; 29/890.02

(56) References Cited

U.S. PATENT DOCUMENTS

| 4,402,746 | 9/1983 | Ramanarayanan et al. . |
|---|---|---|
| 5,209,772 | 5/1993 | Benn et al. . |
| 5,490,775 | 2/1996 | Joshi et al. . |
| 5,770,547 | * 6/1998 | Phong .................................. 505/501 |
| 5,772,427 | 6/1998 | Laurenceau et al. . |
| 5,839,980 | * 11/1998 | Snyder ........................ 239/DIG. 19 |
| 5,931,654 | * 8/1999 | Chamberland ........................ 239/424 |

FOREIGN PATENT DOCUMENTS

| 2035634 | * 8/1991 | (CA) . |
|---|---|---|
| 0 571 984 A1 | 12/1993 | (EP) . |
| 0 646 751 A1 | 4/1995 | (EP) . |
| 04083820 | * 3/1992 | (JP) . |
| 05098397 | * 4/1993 | (JP) . |
| WO 97/22547 | 6/1997 | (WO) . |

OTHER PUBLICATIONS

Patent Abstracts of Japan, vol. 098, No. 001, Jan. 30, 1998.

* cited by examiner

Primary Examiner—Andres Kashnikow
Assistant Examiner—Christopher S. Kim
(74) Attorney, Agent, or Firm—Burns, Doane, Swecker & Mathis, LLP

(57) ABSTRACT

The invention relates to a burner including an injector one end zone (33) of which can be taken to high temperatures during operation of the burner. This end zone is made of an alloy comprising between 16 and 22% by weight of Cr, between 3 and 6% by weight of Al, between 0.1 and 1.0% by weight of Ti, between 0.1 and 1.0% by weight of $Y_2O_3$, and between 70 and 80% by weight of Fe. The burner can be used in a furnace in the glassmaking industry.

19 Claims, 2 Drawing Sheets

BURNER WITH AN IMPROVED INJECTOR AND PROCESS FOR MANUFACTURING THIS INJECTOR

BACKGROUND OF THE INVENTION

1. Field of the Invention

The invention relates to a burner, for example for a furnace in the glassmaking industry, comprising an injector one end zone of which is intended to be exposed, during operation of the burner, to high temperatures.

2. Description of the Related Art

Burners generally comprise an injector fitted into one wall of a combustion chamber and intended to inject an oxidizer and/or a fuel into the latter in order to initiate or maintain a combustion process. Consequently, during operation of the burner, the injector is exposed to high temperature gradients, given that the end of the injector emerging in the combustion chamber is subjected to the temperature prevailing in the combustion chamber, i.e. greater than 1000° C., while its other end, on the feed side, is at a temperature close to ambient temperature.

In order to ensure proper operation of the burner and thus that of the combustion chamber, such an injector must be regularly inspected, and possibly cleaned or replaced.

It will therefore be understood that these injectors are periodically subjected to large heat shocks, and occasionally to mechanical shocks during handling.

Injectors are known which are made of so-called "refractory" stainless steels having a limiting service temperature of 1200° C. and containing a high percentage of nickel.

Although these injectors suitably withstand both the heat shocks and the mechanical shocks, they are often chemically attacked, which impairs their mechanical properties and requires them to be replaced.

In addition, it has proved the case that the nickel present in this steel is a catalyst for the carbonization reaction on the injector, i.e. the growth of solid structures composed of graphitic carbon and starting at the end of the injector. The formation of these graphitized protuberances frequently leads to deflections of the jets of fuel or of the oxidizer and, consequently, to deflections of the flame which, eventually, may strike the quarl and melt it.

The object of the invention is to alleviate these various drawbacks by providing a burner comprising an injector which has good thermal resistance and good mechanical strength, while preventing any risk of the end of the injector being carbonized.

SUMMARY OF THE INVENTION

For this reason, the subject of the invention is a burner comprising an injector one end zone of which can be taken to high temperatures during operation of the burner, characterized in that the said end zone is made of an alloy comprising between approximately 16 and 22% by weight of Cr, between approximately 3 and 6% by weight of Al, between approximately 0.1 and 1.0% of Ti, between approximately 0.1 and 1.0% by weight of $Y_2O_3$ and between approximately 70 and 80% by weight of Fe.

The burner according to the invention may in addition include one or more of the following characteristics:

the said alloy comprises approximately 19% by weight of Cr, 5.5% by weight of Al, 0.5% by weight of Ti, 0.5% by weight of $Y_2O_3$ and 74.5% by weight of Fe;

the length of the said end zone, in the injection direction of the injector, corresponds to that part of the injector which can be taken to a temperature of greater than 700° C. during operation of the burner;

the said length of the said end zone is between approximately 30 and 200 mm;

the said end zone is formed by a piece joined to the injector by screwing;

the said end zone has undergone a heat treatment at a temperature of greater than 800° C. in an oxygen-rich atmosphere;

the heat treatment is carried out a temperature of around 1000° C. and the atmosphere contains at least 21 mol % of oxygen.

The subject of the invention is furthermore a process for manufacturing an injector for a burner, characterized in that it comprises the following steps:

at least one end zone of the injector, which can be taken to high temperatures during operation of the burner, is made of an alloy comprising between approximately 16 and 22% by weight of Cr, between approximately 3 and 6% by weight of Al, between approximately 0.1 and 1.0% by weight of Ti, between approximately 0.1 and 1.0% by weight of $Y_2O_3$ and between approximately 70 and 80% by weight of Fe; and the said end zone is subjected to a heat treatment at a temperature of greater than 800° C. in an oxygen-rich atmosphere.

The process according to the invention may, in addition, include the following characteristic, in which the said heat treatment is carried out at a temperature of around 1000° C. and in that the atmosphere contains at least 21 mol % of oxygen.

Other features and advantages of the invention will emerge from the following description, given by way of example and without any limiting character, together with the appended drawing which shows, diagrammatically, in partial cross section, a burner according to the invention.

DETAILED DESCRIPTION OF THE PREFERRED EMBODIMENTS

Figure 1:
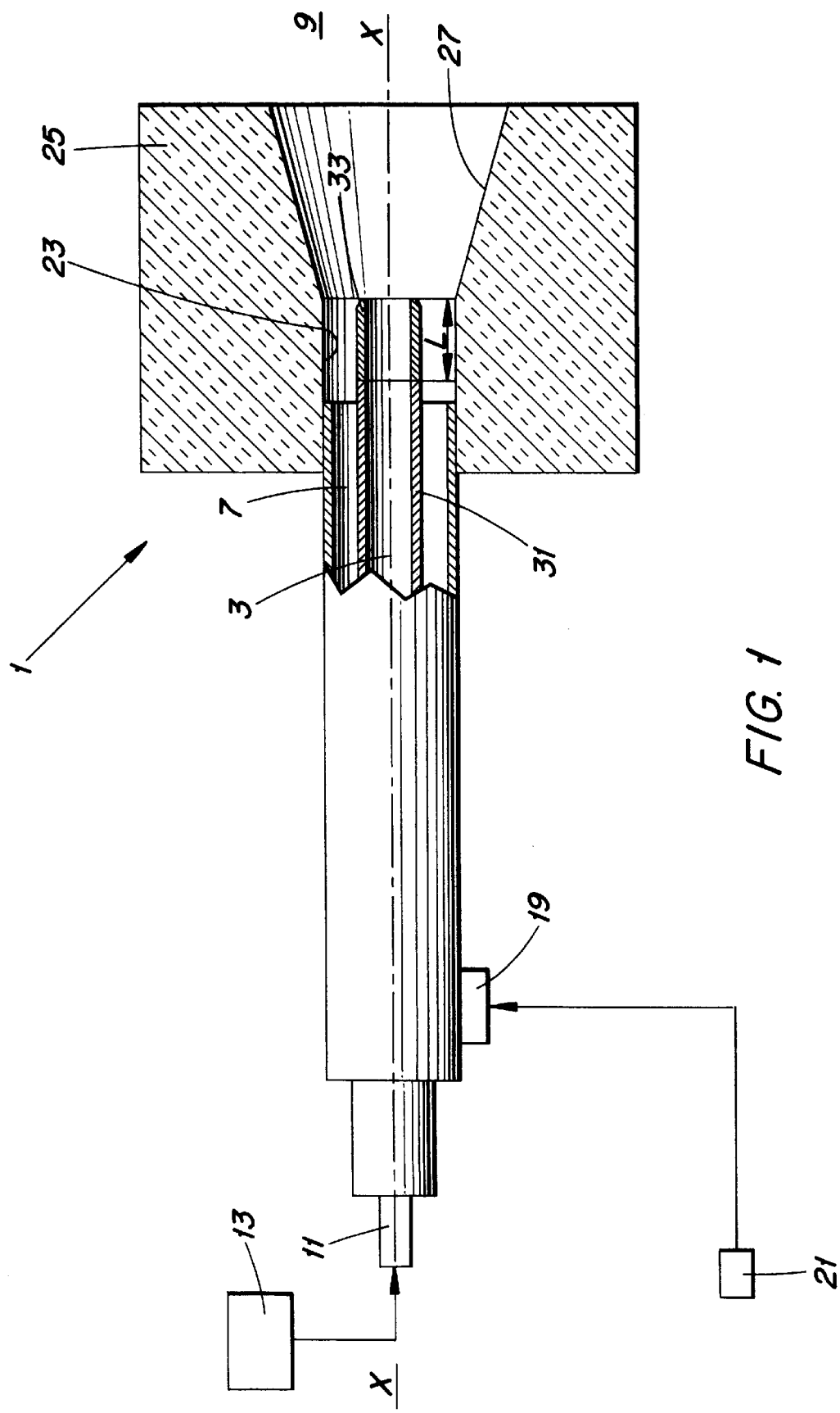
FIG. 1 of the Drawing depicts one embodiment of the burner according to the present invention.

FIG. 1 shows a burner 1 according to the invention. This burner 1 comprises two ducts 3 and 7 for feeding gas into a combustion zone 9. These two ducts 3 and 7 are arranged concentrically around an axis X—X of the burner 1.

The duct 3 is connected via its gas-inlet end 11 to a device 13 for regulating. the flow of a fuel, such as natural gas, for example.

The peripheral annular duct 7 has an inlet 19 for an oxidizer. This duct 7 is fed via a device 21 for regulating the flow of an oxidizer, such as oxygen for example.

As may be seen in the figure, the burner 1 is inserted into a passage 23, called a quarl in the glassmaking industry, in a block 25 of refractory material fitted into the wall of a furnace (not shown). The passage 23 in the block 25 emerges in a flared passage 27 which opens out towards the combustion zone 9.

As may be seen in the figure, the outlet ends of the burner 1 are formed, on the one hand, by the passage 23 made in the block 25 and, on the other hand, by an injector 31 formed, for example, by a central tube.

The end zone 33 of the injector 31 which, during operation of the burner 1, can be taken to high temperatures, of greater than 700° C., is made of an alloy comprising between 16 and 22% by weight of Cr, between 3 and 6% by weight of Al, between 0.1 and 1.0% by weight of Ti, between 0.1 and 1.0% by weight of $Y_2O_3$ and between 60 and 80% by weight of iron.

Preferably, this alloy is composed of 19% of Cr, 5.5% by weight of Al, 0.5% by weight of Ti, 0.5% by weight of $Y_2O_3$ and 74.5% by weight of Fe.

This alloy is a sintered metal product having a high limiting service temperature, of around 1350° C.

In addition, given that this alloy does not contain nickel, there is no risk of a carbonization reaction occurring in the end zone 33 of the injector 31.

Moreover, this alloy has the advantage of forming, by dint of being exposed to high temperatures of greater than 800° C., a protective layer of alumina on the surface which minimizes the risks of carburization of the metal. It will be noted that this alumina layer is not impaired by highly reducing environmental conditions. Finally, this surface alumina layer is the absolute boundary to the oxidation of this alloy which, once its surface has oxidized, becomes insensitive to any oxidizing attack.

This protective layer of alumina may be formed either spontaneously during the first hours of operation of the burner or, especially under the conditions in which the end zone 33 is exposed to a temperature of less than 800° C. and/or to an oxygen-depleted atmosphere, this protective layer is formed beforehand by a heat treatment of this zone for one hour at a temperature of greater than 800° C., preferably at a temperature of around 1000° C. and in an oxygen-rich atmosphere, i.e. an atmosphere containing at least 21 mol % of oxygen.

Advantageously, the length of the said end zone made of the abovementioned alloy is limited, in the injection direction of the injector 31, to a length L corresponding to that part of the injector 31 which can be taken to a temperature of greater than 700° C. during operation of the burner 1. Preferably, the length L of this end zone 33 is between 30 and 200 mm.

In order to reduce the cost of the burner 1, the said end zone 33 is formed by a cylindrical piece which is joined, for example by threads 130, to the rest of the injector 31 which, in its parts exposed to lower temperatures, is made of a refractory steel or a refractory stainless steel, for example. However, if it is necessary to join the piece by welding, laser or electron-beam welding is recommended, this allowing the risk of failure of the weld to be considerably reduced.

Thus, the injector has a high mechanical strength and a high thermal resistance, while preventing the risk of protuberances forming by carbonization, thereby making it possible to space out the maintenance intervals for the injector 3 and to reduce the operating cost of a combustion plant equipped with a burner according to the invention.

Figure 2:
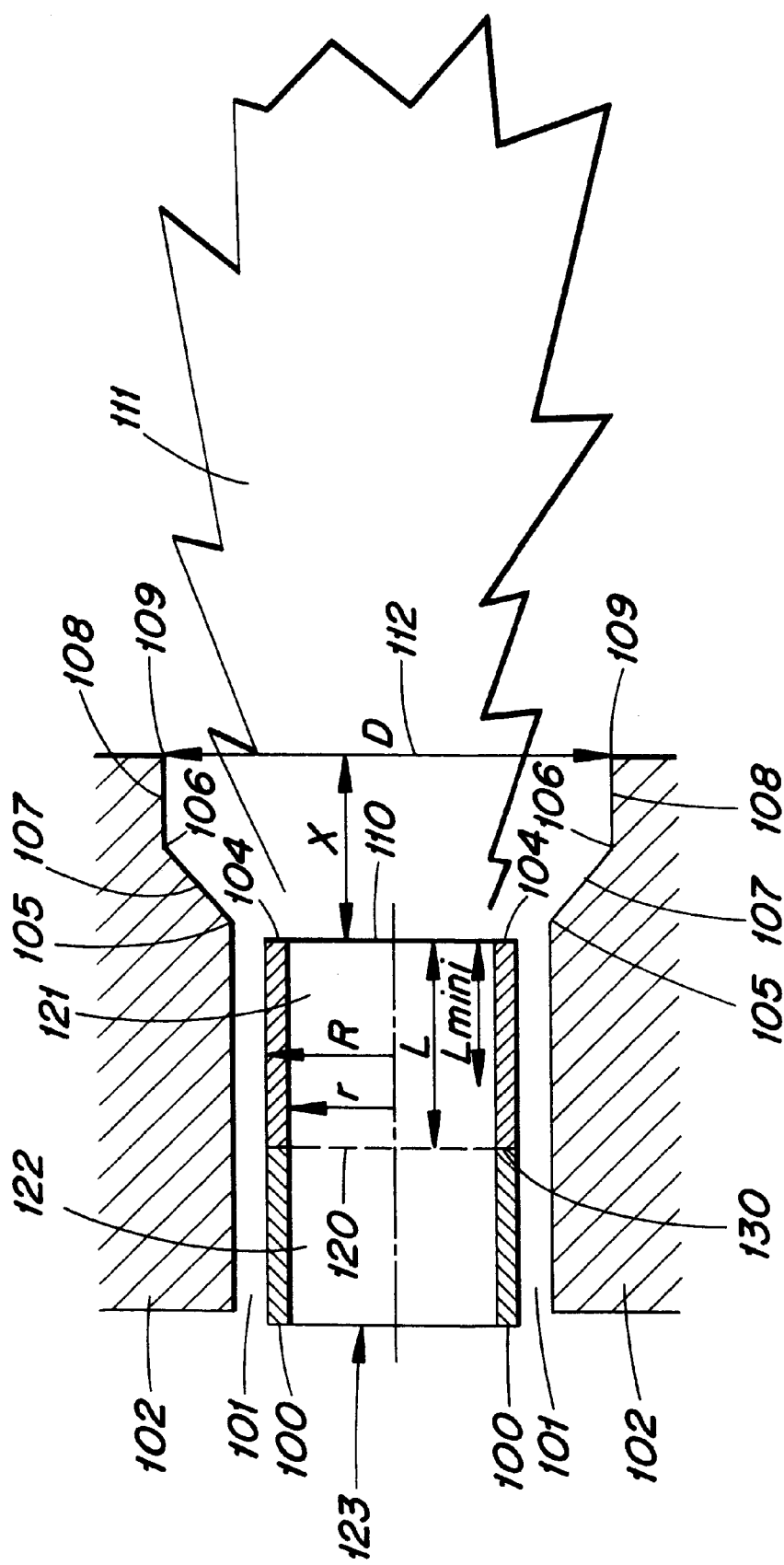
FIG. 2 of the Drawing depicts another embodiment of the burner according to the present invention.

FIG. 2 is another embodiment of the burner according to the invention. The central injector 123 through which combustible gas or oxydant gas (air, oxygen enriched air or pure or substantially pure oxygen) is injected comprises a conduit 100 which is substantially cylindrical (but not necessarily) has an internal diameter r and an external diameter R. The downstream end 104 of the conduit 100 defines a downstream end section 110 which is at a distance X from the downstream end section 112 of the burner block 102. Temperature at the surface 110 is close to 1200° Celcius (for a flame temperature of about 2800° C. in case of an oxy-fuel flame), temperature at the junction 120 between the downstream end 121 and the body 122 of the injector being preferably lower than about 700° C. (this temperature depends on the exact type of material used for the tip of the injector shielding the injector 123 is provided a combustible gas (or oxidizing gas depending on which gas is flowing into the injector, oxidizing or combustible) through the cavity 101, thus cooling this cavity and maintaining a temperature in it which is close to 20° C.

After several experiments, the inventors have discovered that if the distance L between section 110 of the injector 123 and junction 120 is greater than or equal to substantially L mini, with $$L_{MINI} = 1900 \frac{DR\ln\frac{R}{r}}{4\left(\frac{X}{D}\right)^2 + 1}$$

then the temperature at the junction 120 was maintained below about 700° C.

Of course, the burner described above is merely one embodiment for illustrating and explaining the invention.

Thus, burners having injectors with different structures may be provided, the term "injector" being understood to mean not only a central injection tube but any device of the burner intended to introduce a fluid—oxidizer or fuel—into the combustion zone of the furnace.

It is an important aspect of the present invention that only the end zone or zones of the injector of the burner which can be taken to high temperatures, especially of greater than 700° C., i.e. in particular the surface layers, have to be made of the alloy, the composition of which was described in detail above, in order to prevent a carbonization reaction.

What is claimed is:

1. A burner comprising:
   a quarl having an opening; and
   an injector positioned in the quarl, the injector having a downstream end zone with a downstream end, an injector body formed of a material different from that of the downstream end zone, and a junction between the downstream end zone and the injector body, the junction being separated from the downstream end by a distance L, the downstream end zone being made of an alloy comprising
   between approximately 16% and 22% by weight of Cr,
   between approximately 3% and 6 % by weight of Al,
   between approximately 0.1% and 1.0% by weight of Ti,
   between approximately 0.1% and 1.0% by weight Of $Y_2O_3$, and
   between approximately 70% and 80% by weight of Fe;
   wherein the distance L between the downstream end and the junction is greater than or equal to $L_{mini}$, wherein $$L_{mini} = 1900 \frac{DR\ln\frac{R}{r}}{4\left(\frac{X}{D}\right)^2 + 1}$$

wherein D is the inner dimension of the quarl at the quarl opening:
   R is the outer dimension of the injector in the downstream end zone;

r is the inner dimension of the injector in the downstream end zone; and

X is the distance from the injector downstream end to the quarl opening.

2. A burner according to claim 1, wherein the alloy comprises:

approximately 19% by weight of Cr;

approximately 5.5% by weight of Al;

approximately 0.5% by weight of Ti;

approximately 0.5% by weight of $Y_2O_3$; and approximately 74.5% by weight of Fe.

3. A burner according to claim 1, wherein the length of the downstream end zone, in the injection direction of the injector, can be taken to a temperature of greater than 700° C. during operation of the burner.

4. A burner according to claim 3, wherein the distance L is between approximately 30 mm and approximately 200 mm.

5. A burner according to claim 1, wherein the downstream end zone and the injector body each include mating screw threads, the downstream end zone being secured to the injector body with the mating screw threads.

6. A burner according to claim 1, wherein the end zone has been heat treated at a temperature of greater than 800° C. in an oxygen-rich atmosphere.

7. A burner according to claim 6, wherein the heat treatment is carried out at a temperature of around 1000° C. and the oxygen-rich atmosphere contains at least 21 mol % of oxygen.

8. A burner according to claim 1, wherein the end zone is covered with a layer of aluminum.

9. A burner according to claim 2, wherein the length of the downstream end zone, in the injection direction of the injector, can be taken to a temperature of greater than 700° C. during operation of the burner.

10. A burner according to claim 2, wherein the downstream end zone and the injector body each include mating screw threads, the downstream end zone being secured to the injector body with the mating screw threads.

11. A burner according to claim 3, wherein the downstream end zone and the injector body each include mating screw threads, the downstream end zone being secured to the injector body with the mating screw threads.

12. A burner according to claim 2, wherein the end zone has been heat treated at a temperature of greater than 800° C. in an oxygen-rich atmosphere.

13. A burner according to claim 3, wherein the end zone has been heat treated at a temperature of greater than 800° C. in an oxygen-rich atmosphere.

14. A burner according to claim 1, wherein the end zone is covered with a layer of aluminum.

15. A burner according to claim 1, wherein the end zone is covered with a layer of aluminum.

16. A burner according to claim 9, wherein the distance L is between approximately 30 mm and approximately 200 mm.

17. A burner according to claim 12, wherein the heat treatment is carried out at a temperature of around 1000° C. and the oxygen-rich atmosphere contains at least 21 mol % of oxygen.

18. A process for manufacturing the injector of the burner according to claim 1, comprising the following steps:

forming at least one downstream end zone of the injector; and heat treating the at least one downstream end zone at a temperature of greater than 800° C. in an oxygen-rich atmosphere.

19. A process according to claim 18, wherein the step of heat treating is carried out at a temperature of around 1000° C. and in an atmosphere which contains at least 21 mol % of oxygen.

* * * * *